United States Patent
Chun (10) Patent No.: US 8,413,201 B2
(45) Date of Patent: Apr. 2, 2013

(54) METHOD FOR DECIDING RADIO BEARER OF MOBILE IPTV SYSTEM

(75) Inventor: Sun Sim Chun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 255 days.

(21) Appl. No.: 12/857,093

(22) Filed: Aug. 16, 2010

(65) Prior Publication Data

US 2011/0154421 A1 Jun. 23, 2011

(30) Foreign Application Priority Data

Dec. 21, 2009 (KR) ........................ 10-2009-0128411

(51) Int. Cl.
*H04N 7/173* (2011.01)
(52) U.S. Cl. ........................ 725/109; 725/93; 709/219
(58) Field of Classification Search ............ 725/86–116; 709/217–232
See application file for complete search history.

(56) References Cited

U.S. PATENT DOCUMENTS

| | | | |
|---|---|---|---|
| 2007/0165551 A1 | 7/2007 | Proctor et al. | |
| 2009/0093259 A1* | 4/2009 | Edge et al. | 455/456.3 |
| 2009/0286510 A1* | 11/2009 | Huber et al. | 455/410 |
| 2010/0110945 A1* | 5/2010 | Koskela et al. | 370/310 |
| 2011/0149829 A1* | 6/2011 | Terry | 370/312 |

OTHER PUBLICATIONS

Antonios Alexiou et al., "Power Efficient Radio Bearer Selection in MBMS Multicast Mode", MSWIM'07, Oct. 22-26, 2007.
Alessandro Raschella et al., "SINR-based Transport Channel Selection for MBMS Applications", VTC Spring 2009. IEEE 69$^{th}$, pp. 1-5, Apr. 26-29, 2009.
3GPP TS 36.300 v8.7.0 (Dec. 2008): "Evolved Universal Terrestrial Radio Access (E-UTRA) and Evolved Universal Terrestrial Radio Access Network (E-UTRAN); Overall description: Stage 2", pp. 1-144, 2008.
36.300 CR R2-092706, "MBMS baseline for Rel-9", 3GPP TSG-RAN2 Meeting #65bis, Mar. 26, 2009.
3GPP TS 26.346 v8.4.0 (Sep. 2009): "Multimedia Broadcast/Multicast Service (MBMS); Protocols and codecs", pp. 1-137, 2009.

* cited by examiner

*Primary Examiner* — Annan Shang
(74) *Attorney, Agent, or Firm* — Rabin & Berdo, P.C.

(57) ABSTRACT

In a mobile IPTV system, a multicast coordination entity (MCE) acquires information for radio resource allocation for satisfying all terminals through a counting procedure, and determines a radio bearer by considering a share of usage anticipation subcarrier for respective identifiers of contents. A scheduling subject is variable by a characteristic of the determined radio bearer.

18 Claims, 10 Drawing Sheets

METHOD FOR DECIDING RADIO BEARER OF MOBILE IPTV SYSTEM

CROSS-REFERENCE TO RELATED APPLICATION

This application claims priority to and the benefit of Korean Patent Application No. 10-2009-0128411 filed in the Korean Intellectual Property Office on Dec. 21, 2009, the entire contents of which are incorporated herein by reference.

BACKGROUND OF THE INVENTION (a) Field of the Invention

The present invention relates to a radio bearer deciding method of a mobile IPTV system.

(b) Description of the Related Art

In the Universal Mobile Telecommunications System (UMTS) Release 6, each cell allocates a constant amount of power allocated to the cell (e.g., 30% of a base station transmission power) to a forward access channel (FACH) and allocates remaining power to a dedicated channel (DCH) and a high speed downlink shard channel (HS-DSCH). The FACH is a multicast dedicated channel, and the HS-DSCH is a packet dedicated shared channel.

Also, the Release 6 introduces the multimedia broadcast and multicast service (MBMS). The MBMS shares a resource by simultaneously transmitting same data to a plurality of terminals through the FACH in the downlink.

The FACH that is a dedicated channel for providing the MBMS does not apply power control. That is, the FACH uses constant power irrespective of a number of service users requiring the MBMS.

However, if the MBMS is provided by using the FACH when there are a small number of service users requiring the MBMS, a large amount of power is wasted for them. Therefore, when the number of users to whom the multicast transmission method is provided is not big, the 3GPP UMTS has specified in the standard (TS 22.146) to selectively support the unicast transmission method. That is, in order to maximize the system capacity of each cell within the predefined total transmission power limit of a base station and efficiently use the radio resource, the 3GPP UMTS selects the unicast transmission method or multicast transmission method depending on the number of service users requiring the MBMS. Also, the 3GPP UMTS finds the number of service requesters corresponding to a per-channel threshold value through a simulation according to power allocated to the channel, and selects one transport channel of the DCH, HS-DSCH, and FACH as a channel for differently providing the MBMS. However, this radio bearer selecting method is based on the CDMA scheme.

Since recent mobile IPTV systems support the OFDM-based MBMS, a radio bearer deciding method for the OFDM scheme is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a radio bearer deciding method of a mobile IPTV system appropriate for the OFDM scheme.

An exemplary embodiment of the present invention provides a method for a multicast coordination entity (MCE) to determine a radio bearer in a mobile IPTV system for transmitting same contents to a plurality of terminals, including: receiving identifiers of contents selected by the terminals and radio channel information from the terminals; and determining the radio bearer by considering a share of a usage anticipation subcarrier for each identifier of the contents.

Another embodiment of the present invention provides a method for a multicast coordination entity (MCE) to determine a radio bearer in a mobile IPTV system for transmitting same contents to a plurality of terminals, including: receiving identifiers of contents selected by the terminals from the terminals; finding a share of usage anticipation subcarriers for respective identifiers of the contents; determining it to be a point-to-point radio bearer when the share of the usage anticipation subcarrier is less than a reference value; and determining it to be a point-to-multipoint radio bearer when the share of the usage anticipation subcarrier is greater than the reference value.

Yet another embodiment of the present invention provides a method for a multicast coordination entity (MCE) to determine a radio bearer in a mobile IPTV system for transmitting same contents to a plurality of terminals, including: receiving identifiers of contents selected by the terminals from the terminals; calculating a number of terminals for respective identifiers of the contents; and determining a radio bearer by considering a share of usage anticipation subcarriers of the contents starting from an identifier of contents with a lesser number of terminals.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

A radio bearer deciding method of a mobile IPTV system according to an exemplary embodiment of the present invention will now be described with reference to drawings.

When the mobile IPTV aims at performing the function of providing contents to a plurality of users in the wireless manner, the major functions of the cable IPTV headend are very similar to the evolved broadcast multicast service center (eBMSC) for controlling a major function MBMS in the mobile communication system except control information required for radio transmission, and hence the mobile IPTV is very similar to the MBMS of the mobile communication system.

Figure 1:
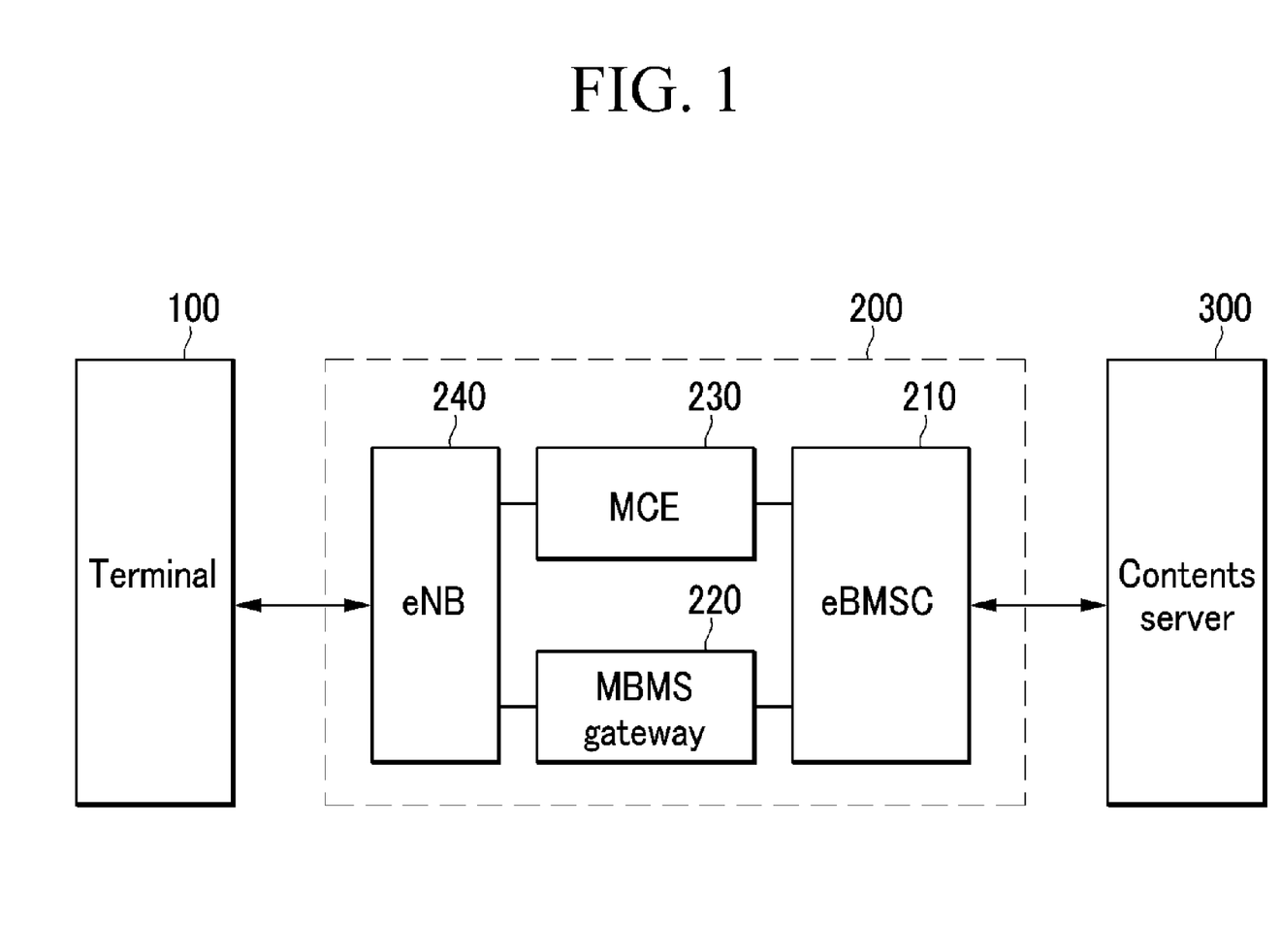
FIG. 1 shows a structure of a mobile IPTV system according to an exemplary embodiment of the present invention.

That is, since the structure of the mobile IPTV system is very much similar to the 3GPP LTE e-MBMS (evolved-MBMS) system or 802.16m MBS (Multicast and Broadcast Services) system corresponding to the mobile communication system, FIG. 1 shows the 3GPP LTE e-MBMS system with the structure of the mobile IPTV system.

FIG. 1 shows a structure of a mobile IPTV system according to an exemplary embodiment of the present invention.

Referring to FIG. 1, the mobile IPTV system includes a terminal 100, a headend 200, and a contents server 300.

The terminal 100 possessed by the user selects contents, receives the contents selected by the user from the headend 200 through radio communication with the headend 200, and provides the same to the user.

The headend 200 performs radio communication with the terminal 100, receives contents from the contents server 300, and transmits the received contents to the terminal 100.

The headend 200 includes an eBMSC 210, an MBMS gateway 220, a multicast coordination entity (MCE) 230, and an eNB 240 corresponding to a base station.

The eBMSC 210 announces the contents provided by the contents server 300 to the user, and authenticates the terminal 100. Also, the eBMSC 210 performs a protocol function according to a characteristic of contents provided by the contents server 300, a coding function for restoring data errors, a function for transmitting wireless data, and a function for transferring setting information.

The MBMS gateway 220 uses a synchronization protocol to the contents transmitted by the eBMSC 210 to transmit the same to the eNB 240 belonging to the multimedia broadcast single frequency network (MBSFN) area, and performs a session control function.

The MCE 230 allocates radio resources used by the eNB's 240 belonging to the multimedia broadcast single frequency network (MBSFN). The MCE 230 can be located in the eNB 240, and can be located on a layer above the eNB's 240 to perform a control function for the MBMS.

The eNB 240 wirelessly transmits the contents provided by the eBMSC 210 to the terminal 100.

The contents server 300 controls various contents including movies, sports, news, music, games, shopping, advertisements, purchase of goods, and video on demand/audio on demand (VOD/AOD) service provided by contents providers. Also, the contents server 300 provides the contents to the terminal 100 through the headend 200 according to a request of the terminal 100.

In general, the 3GPP LTE e-MBMS system or the 802.16m MBS system has the characteristic of adopting the MBSFN transmission method for dividing the unicast service and the MBMS by sub-frames, performing a scheduling process on them, and controlling a plurality of cells to simultaneously transmit the contents compared to the dedicated cell for providing the MBMS service. Here, the unicast service means to determine resource allocation for one user and transmit the contents to the user by using a unicast transport channel. The MBMS signifies to determine the resource allocation in consideration of a plurality of users and transmit traffic to the users by using the unicast transport channel used for the unicast service in addition to the multicast transport channel.

The exemplary embodiment of the present invention discloses a radio bearer deciding method suitable for the OFDM-based MBSFN transmission method, a counting procedure for selecting a radio bearer, and different scheduling subjects for radio bearers.

Figure 2:
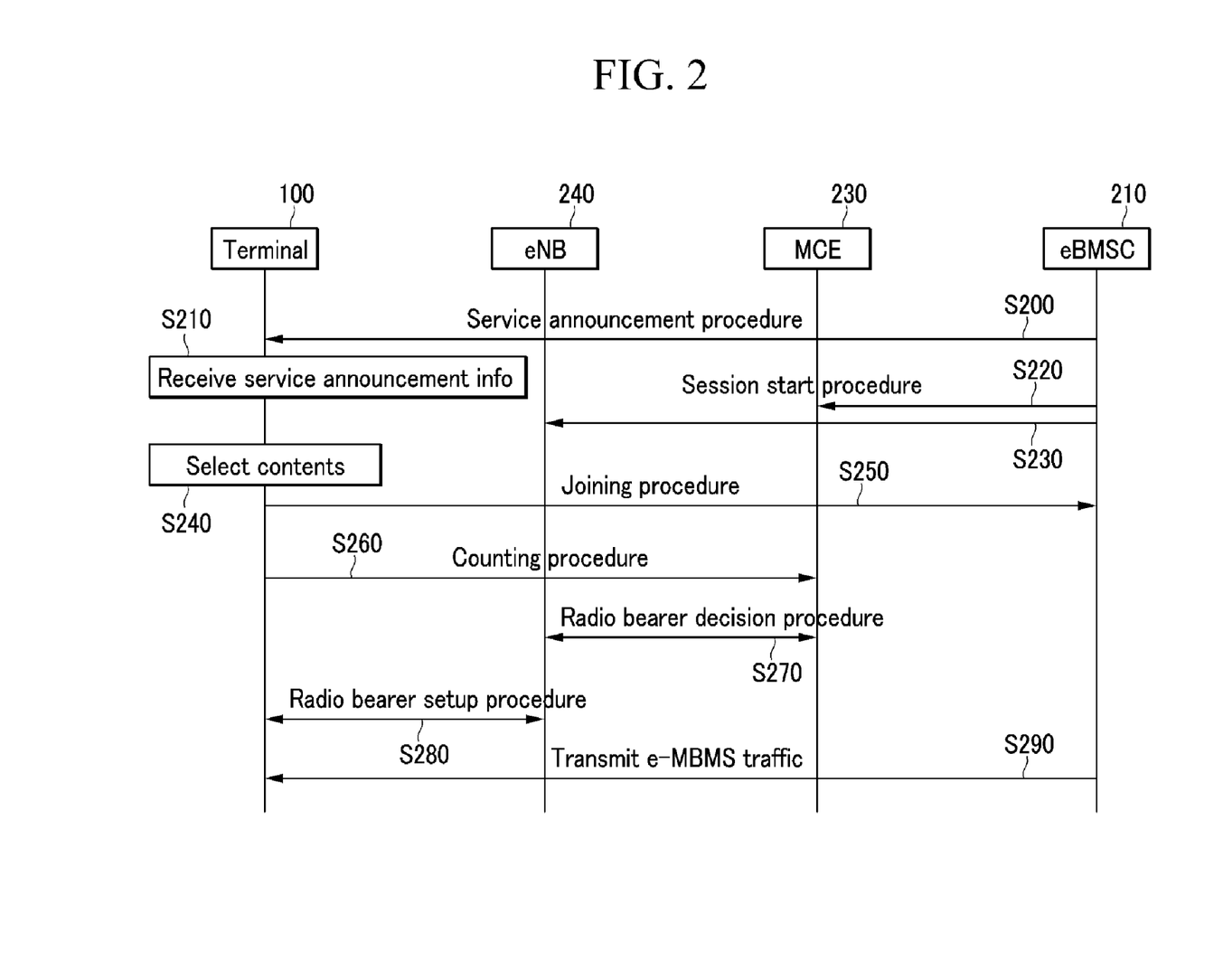
FIG. 2 shows a MBMS transmission method according to an exemplary embodiment of the present invention.

FIG. 2 shows a MBMS transmission method according to an exemplary embodiment of the present invention.

Referring to FIG. 2, the eBMSC 210 performs a service announcement procedure for transmitting service announcement information to the terminal 100 (S200). The service announcement information includes a contents list which includes information on contents identifiers, service start time, duration time, and QoS.

The terminal 100 catches basic information on the contents by receiving service announcement information (S210).

Also, the eBMSC 210 performs a session start procedure (S220-S230). The session start procedure notifies that transmission of contents is ready, and the eBMSC 210 transmits a session start message to the MCE 230 and the eNB 240 to notify that transmission of contents is just about to be started.

The terminal 100 having caught basic information on the contents selects desired contents from the contents list (S240).

The terminal 100 having selected the contents performs a joining procedure (S250). The joining procedure transmits a contents receipt intention, and the terminal 100 transmits the identifier of the selected contents to the eBMSC 210.

The MCE 230 performs a counting procedure in order to check interest of the terminals 100 communicating with the eNB 240 belonging to the MBSFN area for the contents that can be provided by the eBMSC 210 (S260).

The MCE 230 performs a radio bearer decision procedure by using a performance result of the counting procedure (S270). The radio bearer decision procedure determines a contents transmission method, and the MCE 230 determines the contents transmission method by using information acquired from the terminal 100 through the counting procedure and notifies the eNB 240 of the determined transmission method.

The eNB 240 performs a radio bearer setup procedure with the terminal 100 (S280) and transmits e-MBMS traffic (S290). The radio bearer setup procedure and the e-MBMS traffic transmission procedure correspond to the procedure specified in the standards.

Figure 3:
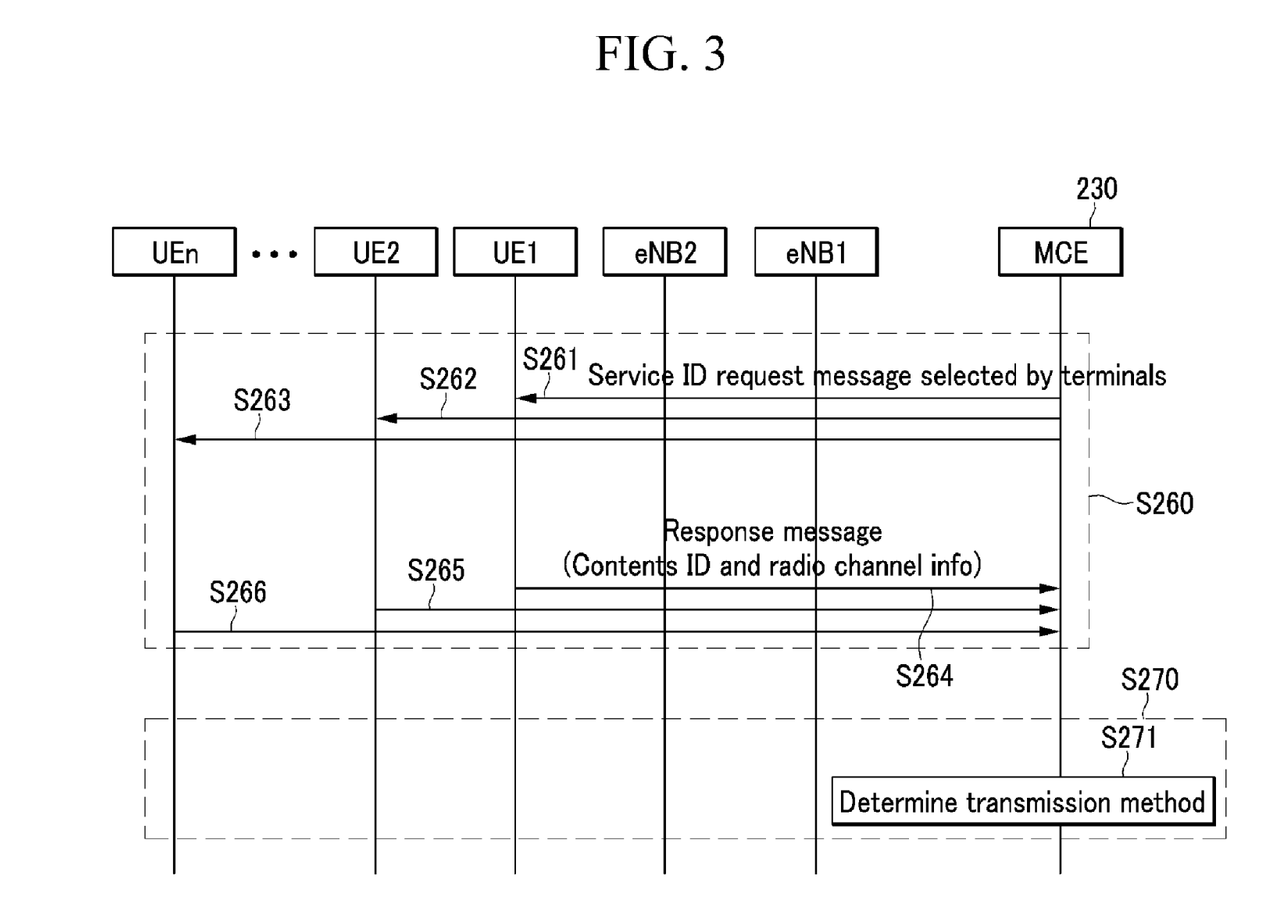
FIG. 3 shows a detailed counting procedure shown in FIG. 2.
Figure 4:
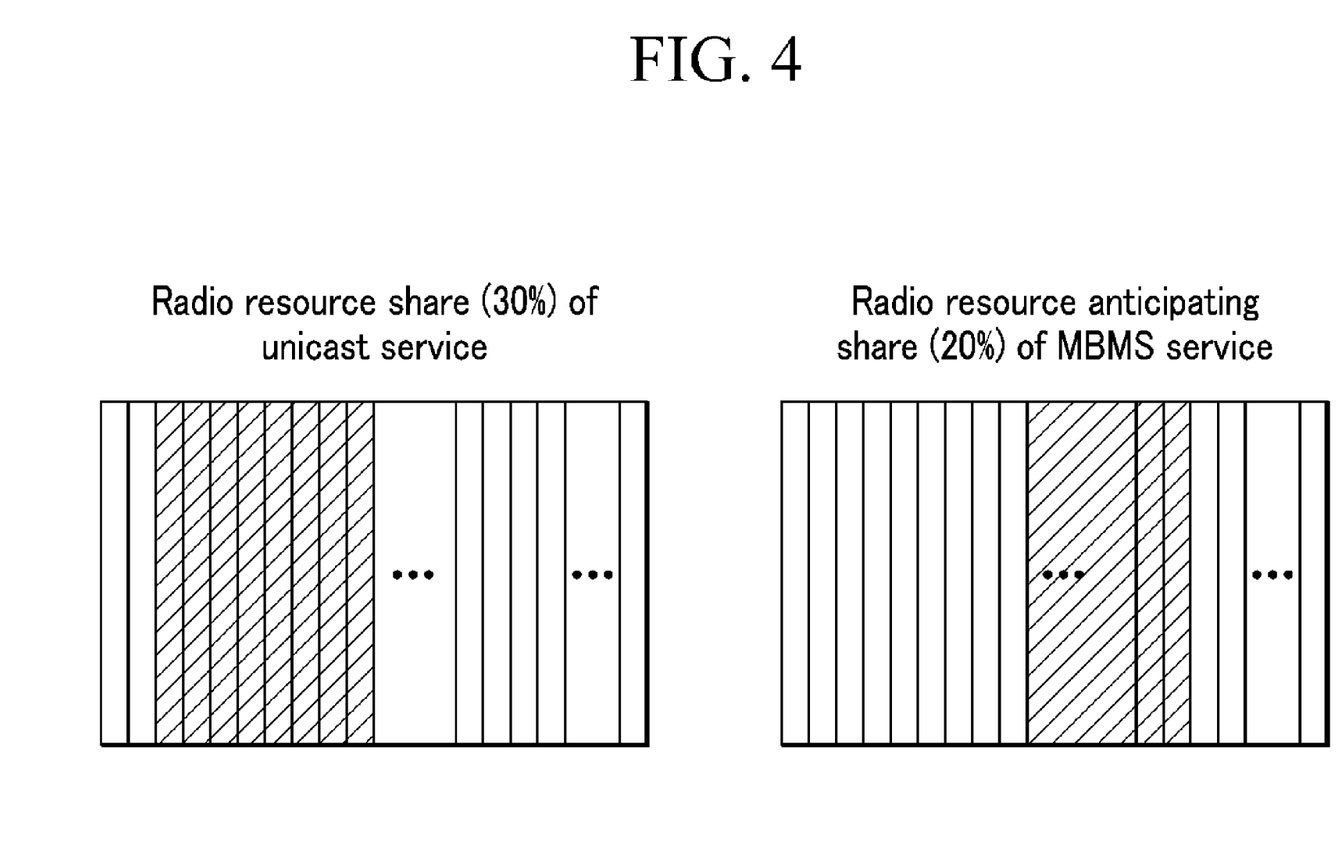
FIG. 4 and FIG. 5 show radio resource shares of a unicast service and an MBMS.
Figure 5:
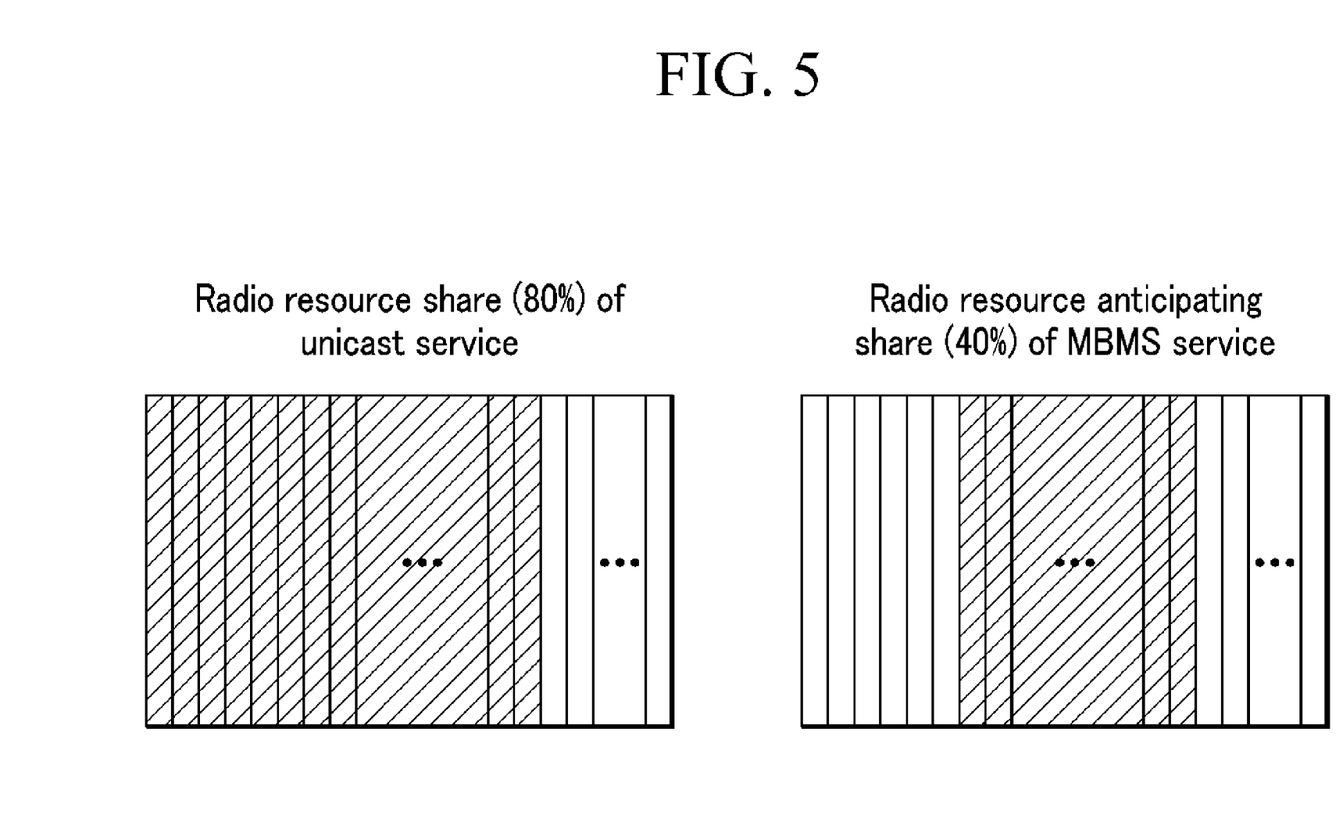
Figure 6:
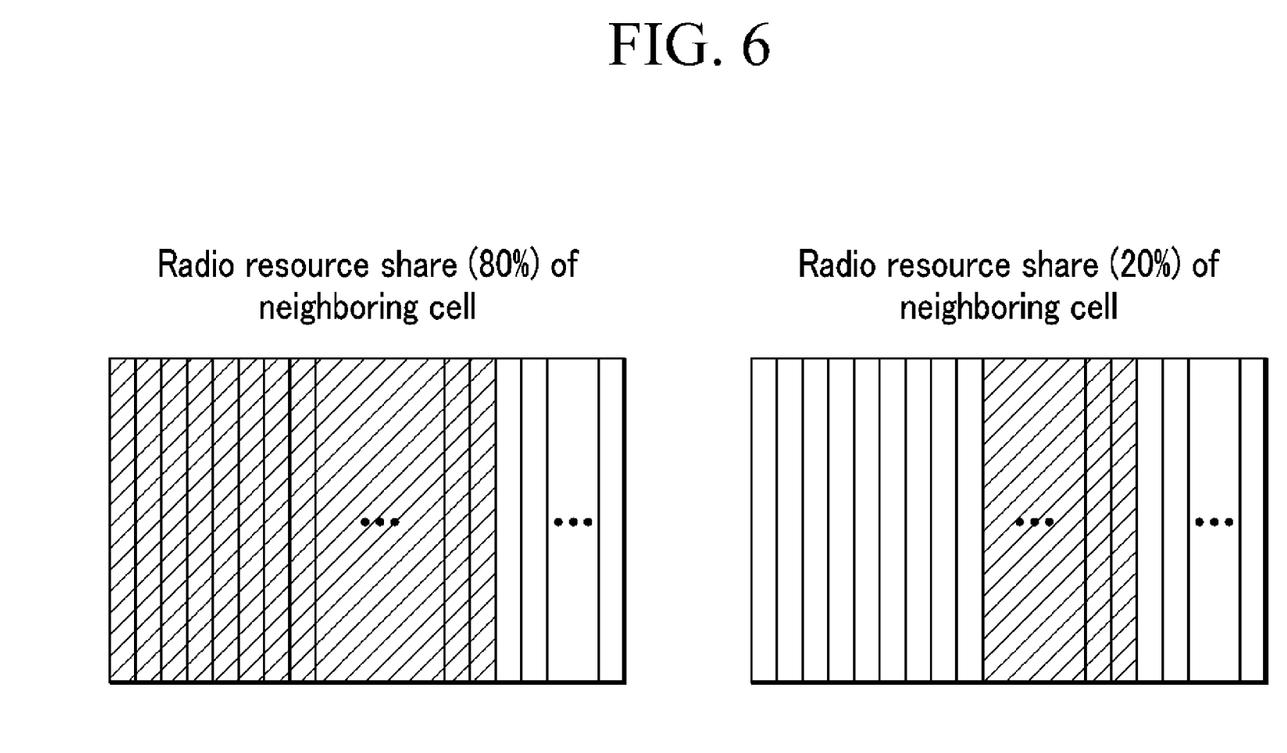
FIG. 6 shows a radio resource share of a neighboring cell.

FIG. 3 shows a detailed counting procedure shown in FIG. 2. FIG. 4 and FIG. 5 show radio resource shares of a unicast service and an MBMS, and FIG. 6 shows a radio resource share of a neighboring cell. FIG. 3 shows two eNB's and n terminals (UE1, UE2, . . . , UEn) in one MBSFN area, and the two eNB's have reference numerals eNB1 and eNB2. Also, FIG. 3 shows that the terminals (UE1, UE2, . . . , UEn) have a contents receipt intention to the MCE 230 transmitted in the joining procedure.

Referring to FIG. 3, the MCE 230 transmits a service identifier request message for requesting contents identifiers from the terminals (UE1, UE2, . . . , UEn) having transmitted the contents receipt intention in the joining procedure (S261-S263).

The terminals (UE1, UE2, . . . , UEn) having received the service identifier request messages selected by the terminals transmit a response message including the identifiers of the terminals (UE1, UE2, . . . , UEn), identifiers of the contents selected by the terminals (UE1, UE2, . . . , UEn), and radio channel information to the MCE 230 (S264-S266). In this instance, the radio channel information includes N (N is a positive integer) pieces of sub-band information in the worst channel state and signal to interference and noise ratio (SINR) information on subcarriers other than the N pieces of sub-band information. In this instance, one piece of sub-band information includes a plurality of subcarriers.

The main purpose of resource allocation in the MBMS service is to provide a service to all the terminals requiring the service, and hence the method for satisfying all the terminals is to transmit not N pieces of sub-band information in the best channel state but N pieces of sub-band information in the worst channel state. That is, it is a method for satisfying all the terminals by escaping radio resource allocation in the worst channel state as much as possible. Also, the N pieces of sub-band information in the worst channel state can find interference for each sub-band. Average SINR information transmitted by the terminals becomes a reference point for determining the terminal in the worst channel state. The purpose of including the reception of the radio channel information of the respective terminals into the counting procedure is to set a radio bearer for maximizing efficiency of the MBMS radio resource.

The MCE 230 checks the number of terminals for respective contents, finds a share of available subcarriers usable by the contents by using the number of terminals, and determines the transmission method to be applied to the contents according to the share (S271).

In general, as shown in FIG. 4, when the radio resource share of the unicast service is 30% and the radio resource anticipating share of the MBMS having the contents identifier of 1 is 20%, the MBMS must be provided to the user having requested the contents with the contents identifier of 1 according to the unicast transmission method. On the contrary, as shown in FIG. 5, when the radio resource share of the unicast service is 80% and the radio resource anticipating share of the MBMS having the contents identifier of 2 is 40%, the MBMS must be provided to the user having requested the contents with the contents identifier of 1 according to the multicast transmission method. Further, influence of interference applied to the subcarrier can be varied depending on the radio resource share of the neighboring cell. For example, as shown in FIG. 6, the case in which the radio resource share of the neighboring cell is 80% and the case in which the radio resource share of the neighboring cell is 20% may have different interference applied to the subcarrier.

Therefore, the MCE 230 determines the radio bearer by consideration of a current subcarrier usage share, a subcarrier share influenced by a neighboring cell, and a number of terminals having selected contents.

In detail, the MCE 230 finds a share of usage anticipation subcarriers for the respective contents by using the number of terminals for the respective contents, and compares the share with a reference value. The MCE 230 selects the unicast transmission method when the share of the usage anticipation subcarriers of the contents is less than the reference value, and it selects the multicast transmission method when the share of the usage anticipation subcarriers of the contents is greater than the reference value. Here, the reference value can be set as expressed in Equation 1.

Reference value=1−(current subcarrier usage share+ subcarrier share influenced by neighboring cell), 0=reference value=1 (Equation 1)

Also, the share of the usage anticipation subcarriers for respective contents can be found as expressed in Equation 2.

Usage anticipation subcarrier share=(number of subcarriers occupied by contents×number of terminals having selected contents)/number of total subcarriers (Equation 2)

In Equation 2, the share of the usage anticipation subcarriers is determined by the number of terminals having selected the contents. That is, the radio bearer of the contents can be determined by the number of terminals having selected the contents, and particularly, the probability of selecting the unicast transmission method is increased as the number of terminals having selected the contents becomes lesser. Therefore, the MCE 230 determines the transmission method to be applied to the contents starting from the contents with a small number of terminals. Then, it is advantageous to allocate the resource that is left after it is allocated by the unicast transmission method. Also, the radio resource can be efficiently managed since the contents selected by many terminals are transmitted according to the multicast transmission method.

Figure 7:
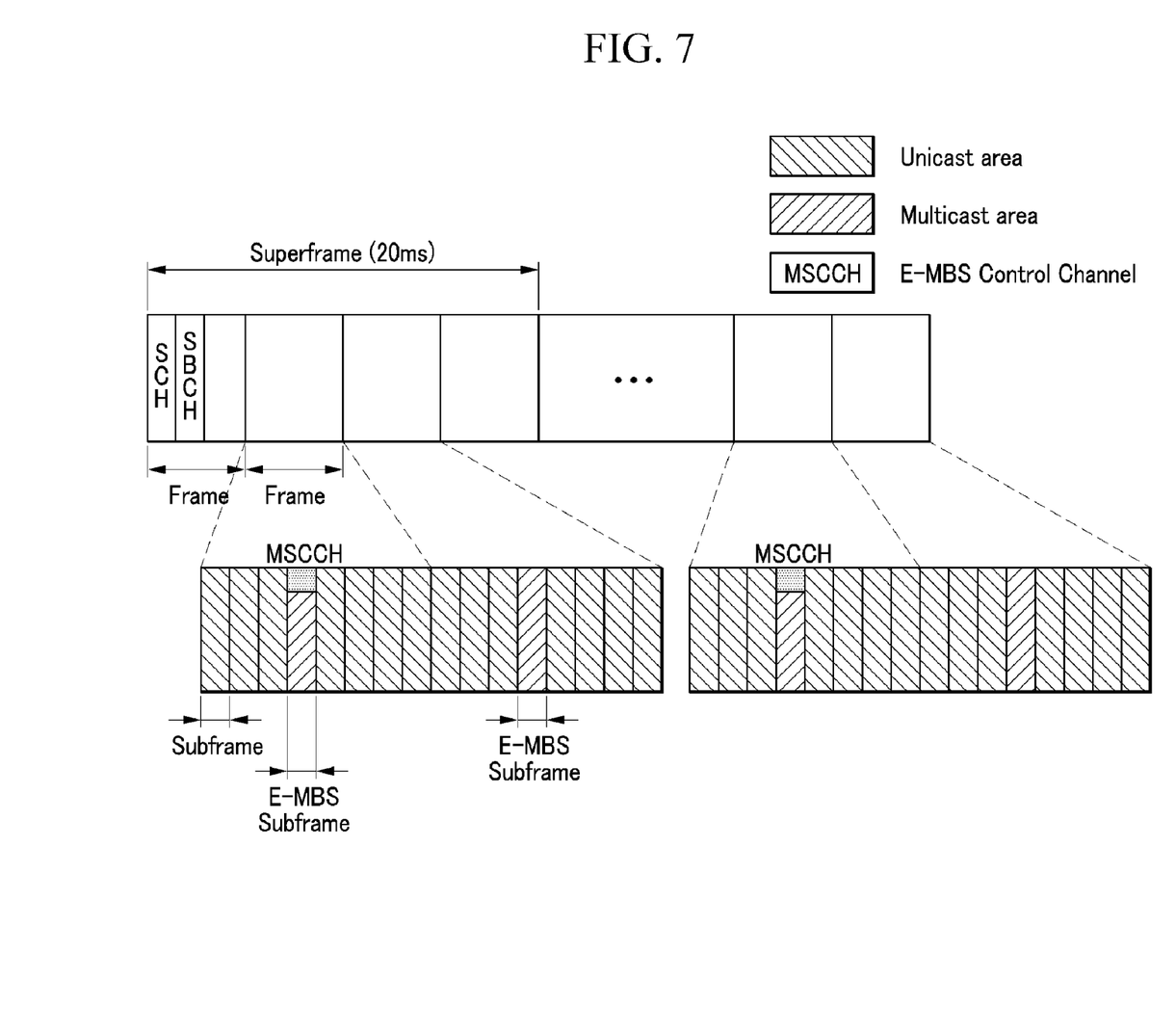
FIG. 7 shows a frame structure of the 802.16m MBS system.
Figure 8:
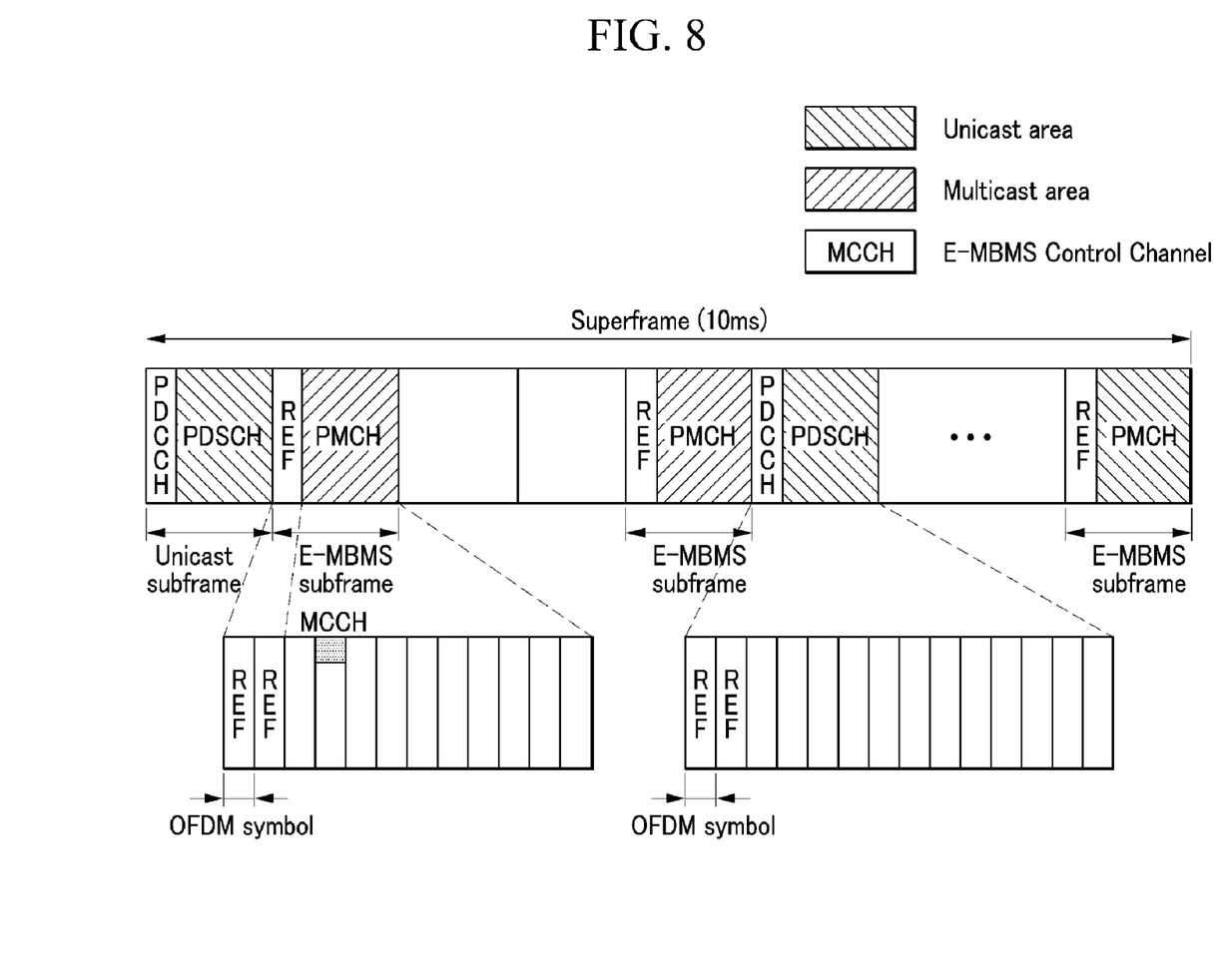
FIG. 8 shows a frame structure of the 3GPP LTE e-MBMS system.
Figure 9:
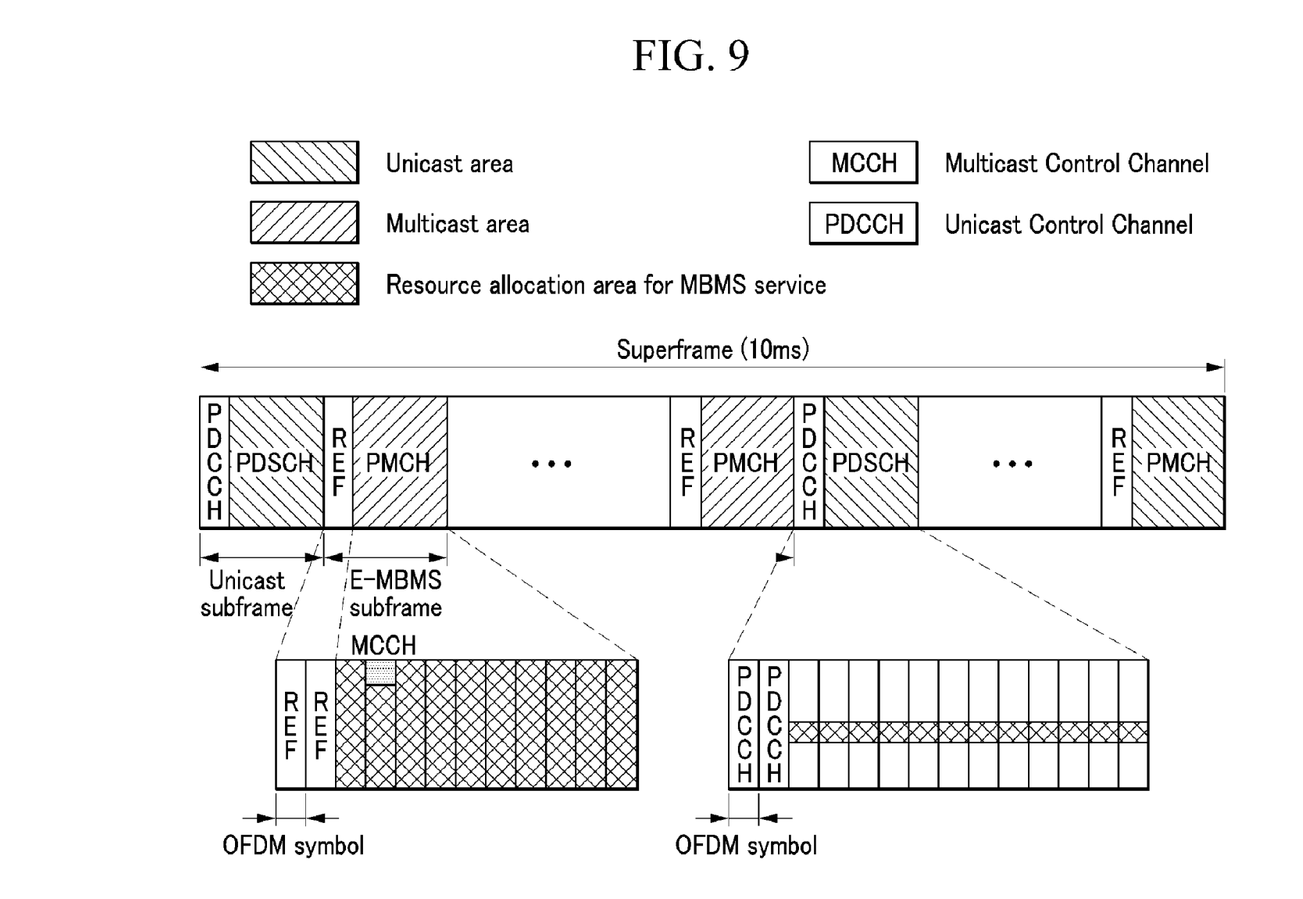
FIG. 9 shows a frame structure according to an exemplary embodiment of the present invention.

The selected radio bearer for respective contents simultaneously uses the unicast transmission method and the multicast transmission method as shown in FIG. 9 other than using the coexisting method of the subframe allocated to the unicast service and the subframe allocated to the MBMS as shown in FIG. 7 and FIG. 8.

The determined radio bearer for respective contents does not divide the area into the unicast area for the unicast service and the multicast area for the MBMS service and allocate the resource thereto in a like manner of the frame structure of the 802.16m MBS system shown in FIG. 7 and the frame structure of the 3GPP e-MBMS system shown in FIG. 8.

In the exemplary embodiment of the present invention, as shown in FIG. 9, the MBMS service is simultaneously allocated to the unicast area and the multicast area. That is, the MBMS contents identifier determined as a unicast bearer is allocated to the unicast area (PDSCH area), and the MBMS contents identifier determined as a multicast bearer is allocated to the multicast area (PMCH area).

FIG. 7 shows a frame structure of the 802.16m MBS system, FIG. 8 shows a frame structure of the 3GPP LTE e-MBMS system, and FIG. 9 shows a frame structure according to an exemplary embodiment of the present invention.

Referring to FIG. 9, it becomes possible to simultaneously transmit the MBMS contents through the unicast transmission method and the multicast transmission method by using the existing frame structure of the existing system without requesting to change the frame structure of the existing system (e.g., the 802.16m MBS system of FIG. 7 and the 3GPP e-MBMS system of FIG. 8.)

Figure 10:
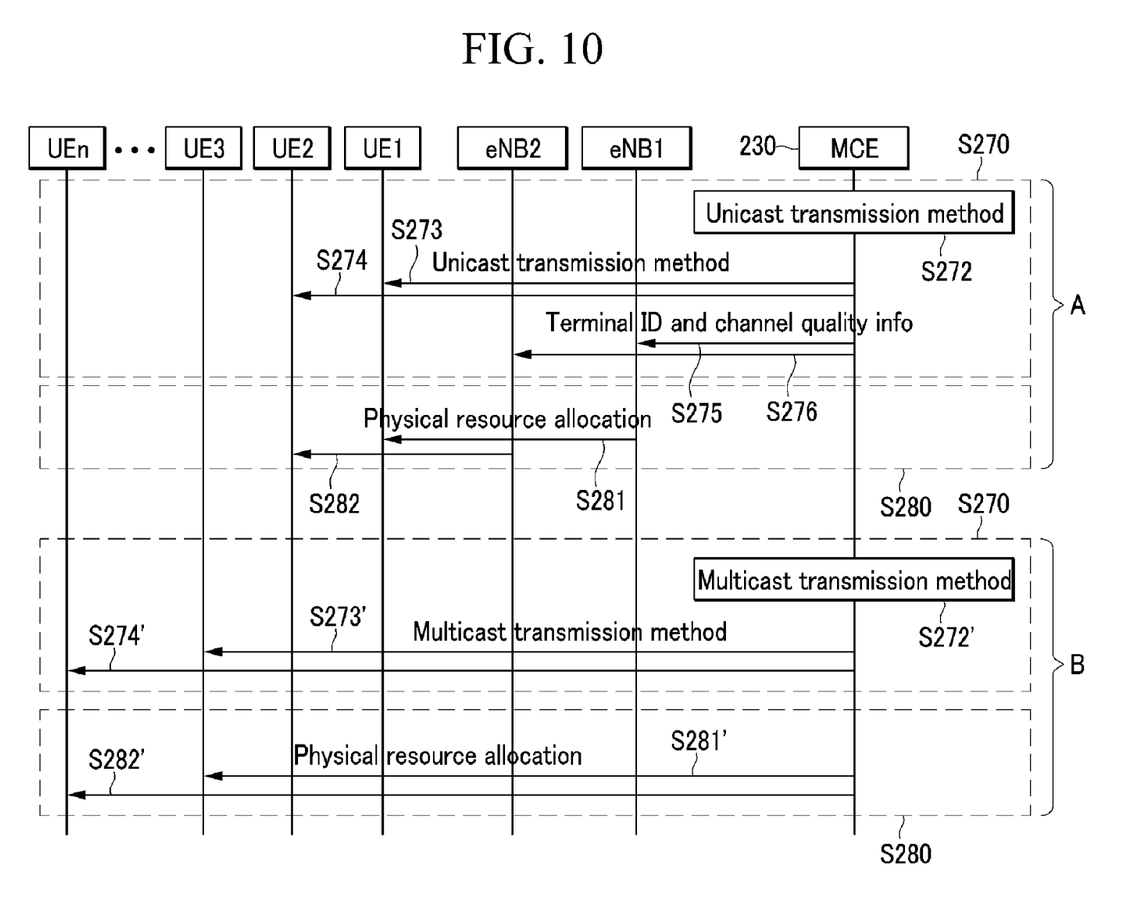
FIG. 10 shows a method for a transport channel to allocate a physical resource according to the unicast and multicast transmission method.

FIG. 10 shows a method for a transport channel to allocate a physical resource according to the unicast and multicast transmission method. FIG. 10 shows that the unicast transmission method is determined for the transmission method of the contents that are determined to be transmitted to the two terminals UE1 and UE2 from among the terminals (UE1, UE2, . . . , UEn), and the multicast transmission method is determined for the transmission method of the contents that are determined to be transmitted to the remaining terminals (UE3-UEn). Also, it is assumed in FIG. 10 that the terminal UE1 is controlled by the eNB1 and the terminals (UE2-UEn) are controlled by the eNB2.

Referring to part A of FIG. 10, when the unicast transmission method is determined for the radio bearer of the contents that are determined to be transmitted to the terminals UE1 and UE2 of the terminals (UE1, UE2, . . . , UEn) (S272), the MCE 230 notifies to transmit the contents to the terminals UE1 and UE2 through the unicast transmission method in the PDSCH area of FIG. 9 (S273-S274).

The MCE 230 transmits identifiers and channel quality information of the terminals UE1 and UE2 that are acquired from the terminals UE1 and UE2 through the counting procedure to the eNB1 and the eNB2 (S275-S276).

The eNB1 and the eNB2 allocate physical resources of transport channels to be used for the unicast transmission method to the terminals UE1 and UE2 by using channel quality information of the terminals UE1 and UE2 (S281-S282).

Referring to part B of FIG. 10, when the multicast transmission method is determined for the radio bearer of the contents that are determined to be transmitted to the terminals (UE3, . . . , UEn) from among the terminals (UE1, UE2, . . . , UEn) (S272'), the MCE 230 notifies to transmit the contents to the terminals (UE3, . . . , UEn) through the multicast transmission method in the PMCH of FIG. 9 (S273'-S274').

The MCE 230 allocates the physical resources of transport channels to be used for the multicast transmission method to the terminals (UE3, . . . , UEn) by using channel quality information acquired from the terminals (UE3, . . . , UEn) through the counting procedure (S281'-S282').

In FIG. 10, the subject of scheduling for allocating the physical resource of the transport channel is variable by the radio bearer. The physical resources of transport channels are allocated by the eNB1 and the eNB2 in the case of the unicast transmission method as shown by part A of FIG. 10, and the physical resources of transport channels are allocated by the MCE 230 in the case of the multicast transmission method as shown by part B of FIG. 10. The above-noted independent scheduling method allows allocation of physical resources of the transport channels to be used for the multicast transmission method regardless of the location of the MCE 230.

According to an embodiment of the present invention, efficiency of a radio resource can be maximized by proposing a radio bearer deciding method considering a characteristic of the OFDM scheme without changing a structure of a standardized frame.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a multicast coordination entity (MCE) to determine a radio bearer in a mobile IPTV system for transmitting same contents to a plurality of terminals, comprising:
   receiving identifiers of contents selected by the terminals and radio channel information from the terminals; and
   determining the radio bearer by considering at least one of a share of a usage anticipation subcarrier for each identifier of the contents, a share of the subcarrier influenced by a neighboring cell, and a number of terminals desiring the contents.

2. The method of claim 1, wherein the determining includes,
determining one of a unicast transmission method of a point-to-point radio bearer and a multicast transmission method of a point-to-multipoint radio bearer according to a share of the usage anticipation subcarrier.

3. The method of claim 2, further comprising:
when it is determined to be the multicast transmission method of the point-to-multipoint radio bearer, allocating a physical resource of a transport channel used for the multicast transmission method of the point-to-multipoint radio bearer by using the radio channel information.

4. The method of claim 2, further comprising:
when it is determined to be the unicast transmission method of the point-to-point radio bearer, transmitting the radio channel information to a base station wirelessly communicating with the terminals, wherein a physical resource of a transport channel used for the unicast transmission method of the point-to-point radio bearer is allocated based on the radio channel information of the base station.

5. The method of claim 3, wherein
the radio channel information includes N pieces of sub-band information in the worst channel state and signal to interference and noise ratio (SINR) information on subcarriers other than the N pieces of sub-band information, and
N is a positive integer.

6. The method of claim 5, wherein
the radio resource is allocated by considering the SINR of the subcarriers other than the N pieces of sub-band information from among available subcarriers.

7. The method of claim 1, wherein
the determining includes determining the radio bearer in the order of identifiers of the contents with a lesser number of terminals.

8. The method of claim 1, wherein
the determining includes:
finding the share of usage anticipation subcarriers for respective identifiers of the contents;
when the share of the usage anticipation subcarrier is less than a reference value, determining a unicast transmission method of a point-to-point radio bearer; and
when the share of the usage anticipation subcarrier is greater than the reference value, determining a multicast transmission method of a point-to-multipoint radio bearer,
wherein the reference value is set by a usage share of the current subcarrier and a share of the subcarrier influenced by neighboring cells.

9. The method of claim 8, wherein
the finding of the share includes
finding the share of the usage anticipation subcarrier by dividing the product of the subcarrier occupied by the contents and a number of terminals desiring the contents by the entire subcarriers.

10. A method for a multicast coordination entity (MCE) to determine a radio bearer in a mobile IPTV system for transmitting the same contents to a plurality of terminals, comprising:
   receiving identifiers of contents selected by the terminals from the terminals;
   finding a share of usage anticipation subcarriers for respective identifiers of the contents;
   determining it to be a point-to-point radio bearer when the share of the usage anticipation subcarrier is less than a reference value; and determining it to be a point-to-multipoint radio bearer when the share of the usage anticipation subcarrier is greater than the reference value, wherein the reference value is determined by a usage share of the current subcarrier and a share of the subcarrier influenced by a neighboring cells, and the share of the usage anticipation subcarrier is determined by a number of subcarriers occupied by the contents and a number of terminals having selected the contents.

11. The method of claim 10, further comprising:

receiving radio channel information from the terminals; and allocating a radio resource of the point-to-multipoint radio bearer by using the radio channel information when it is determined to be the point-to-multipoint radio bearer.

12. The method of claim 10, further comprising:

receiving radio channel information from the terminals; and transmitting the radio channel information to a base station wirelessly communicating with the terminals when it is determined to be the point-to-point radio bearer, wherein the base station allocates the radio resource of the point-to-point radio bearer by using the radio channel information.

13. The method of claim 11, wherein the radio channel information includes at least one piece of sub-band information in the worst channel state and signal to interference and noise ratio (SINR) information on subcarriers other than the at least one piece of sub-band information.

14. The method of claim 10, wherein the point-to-point radio bearer or the point-to-multipoint radio bearer is selected starting from the identifier of the contents with a lesser number of terminals.

15. A method for a multicast coordination entity (MCE) to determine a radio bearer in a mobile IPTV system for transmitting same contents to a plurality of terminals, comprising:

receiving identifiers of contents selected by the terminals from the terminals;

calculating a number of terminals for respective identifiers of the contents; and determining a radio bearer by considering at least one of a share of usage anticipation subcarriers of the contents, a share of the subcarrier influenced by a neighboring cell, and a number of terminal desiring the contents starting from an identifier of contents with a lesser number of terminals.

16. The method of claim 15, wherein the share of the usage anticipation subcarrier is determined by a number of subcarriers occupied by the contents and a number of terminals having selected the contents.

17. The method of claim 16, wherein the determining includes:

when the share of the usage anticipation subcarrier is less than a reference value, selecting a unicast transmission method of a point-to-point radio bearer; and when the share of the usage anticipation subcarrier is greater than the reference value, selecting a multicast transmission method of a point-to-multipoint radio bearer, wherein the reference value is set by a usage share of the current subcarrier and a share of the subcarrier influenced by neighboring cells.

18. The method of claim 16, further comprising:

receiving radio channel information from the terminals, wherein a physical resource of the radio bearer selected by using the radio channel information is allocated.

\* \* \* \* \*